United States Patent [19]

Craun

[11] Patent Number: 5,464,885
[45] Date of Patent: * Nov. 7, 1995

[54] LOW VOC, AQUEOUS DISPERSED, EPOXY-ESTER ACRYLIC GRAFT COATINGS

[75] Inventor: Gary P. Craun, Berea, Ohio

[73] Assignee: The Glidden Company, Cleveland, Ohio

[*] Notice: The portion of the term of this patent subsequent to Mar. 1, 2011, has been disclaimed.

[21] Appl. No.: 222,029

[22] Filed: Apr. 4, 1994

[51] Int. Cl.⁶ .............................. C08K 3/20; C08L 63/02
[52] U.S. Cl. .................. 523/423; 523/501; 525/118; 525/119; 525/438; 525/530
[58] Field of Search ................................. 523/423, 501; 525/438, 118, 119, 530

[56] References Cited

U.S. PATENT DOCUMENTS 5,290,828  3/1994  Craun et al. ............................ 523/423

Primary Examiner—Melvyn I. Marquis
Assistant Examiner—D. Aylward
Attorney, Agent, or Firm—Thomas M. Schmitz

[57] ABSTRACT

An aqueous dispersed acrylic grafted epoxy-ester polymer useful as a polymeric binder for protective coatings is produced by first forming a carboxyl functional epoxy-ester by esterifying a low molecular weight epoxy resin with a low molecular weight, unsaturated, carboxyl terminated polyester, followed by in-situ copolymerizing ethylenic monomers in the presence of water-dispersed epoxy-ester.

6 Claims, No Drawings

LOW VOC, AQUEOUS DISPERSED, EPOXY-ESTER ACRYLIC GRAFT COATINGS

This invention pertains to protective coatings containing zero or very low levels of volatile organic compounds (VOC), and more particularly to aqueous dispersed epoxy-ester acrylic-graft polymeric binders particularly useful for coating interior substrates of beer and beverage containers (cans).

BACKGROUND OF THE INVENTION

Protective surface coatings are organic compositions applied to substrates to form continuous films which are cured or otherwise hardened to provide protection as well as a decorative appearance to the substrate. Protective surface coatings ordinarily comprise an organic polymeric binder, pigments, inert fillers and other additives, where the polymeric binder acts as a fluid vehicle for the pigments and imparts rheological properties to the fluid paint coating. Upon curing, the polymeric binder hardens and functions as a binder for the pigments and provides adhesion of the dried paint film to the substrate. The pigments may be organic or inorganic and functionally contribute to opacity and color in addition to durability and hardness, although some paint coatings contain little or no opacifying pigments and are described as clear coatings. The manufacture of paint coatings involves the preparation of a polymeric binder, mixing of component materials, grinding of pigments in the polymeric binder, and thinning to commercial standards.

Epoxy resins are particularly desirable for use in surface coating materials as a vehicle or polymeric binder to advantageously provide toughness, flexibility, adhesion, and chemical resistance to the applied coating film. Hence, water-dispersed coating compositions containing epoxy resins are highly desirable for can coating compositions. Coatings for soft drink and beer cans, for instance, are critical due to taste sensitivity and must not alter the taste of canned beverages. Taste problems can occur in a variety of ways such as by leaching of coating components into the beverage, or by adsorption of flavor by the coating, or sometimes by chemical reaction, or by some combination thereof.

In commonly assigned U.S. Pat. No. 4,212,781, a process is disclosed for modifying epoxy resin by reacting the epoxy resin with addition polymerizable ethylenic monomer in the presence of at least 3% by weight of benzoyl peroxide (or the free radical initiating equivalent thereof) based on monomer at a suitable reaction temperature to produce a reaction mixture comprising an epoxy-acrylic copolymer mixture containing epoxy resin, graft epoxy-acrylic polymer, and associatively-formed ungrafted addition polymer. The in-situ polymerized monomers include acid functional monomers to provide acid functionality in the reaction mixture sufficiently high to effect stable dispersion of the resulting reaction product in a basic aqueous medium. Similarly, commonly assigned U.S. Pat. No. 4,522,961 pertains to a mixture of polymers comprising a self-curing emulsion polymer (latex), an epoxy-acrylic graft copolymer, and preferably a phosphate additive. Related commonly assigned patents are U.S. Pat. Nos. 4,285,847 and 4,399,241, and 5,212,241. Most prior art water-dispersed epoxy coatings utilize relatively high levels of organic solvent to assist processing of the epoxy resin. Although epoxy containing coatings have long been the standard of excellence in beverage can liners, such coatings cannot be prepared without significant amounts of solvent, where typically 50% to 100% volatile organic solvent is required based on solids (about 2.5 to 4 lb./gal.). Recent environmental concerns and legislative pressure have created the need for a zero or near zero VOC can coating.

It now has been found that high quality aqueous dispersed epoxy coatings can be produced with no organic solvent by esterifying low molecular weight epoxy resin with low molecular weight carboxyl functional polyester to produce a carboxyl functional low molecular weight epoxy-ester, mixing the epoxy ester with ethylenic monomers and dispersing the mixture within water, and then copolymerizing the ethylenically unsaturated monomers to produce an emulsion polymer useful as a polymeric binder. In particular, it has been found that aqueous emulsion dispersions of the epoxy-ester addition copolymer can be prepared and maintained dispersed in water without conventional surfactants and by ammonia neutralization of the epoxy-ester carboxyl groups without the need for any volatile organic solvents. Copolymerization of the ethylenic monomers produces a stable small particle size polymeric dispersion.

It has been found that low molecular weight epoxy resins are easily processable at lower temperatures and viscosities while low molecular weight oligomer carboxyl functional polyesters lower the overall viscosity of the mixture and provides considerably improved processability. Temperature control during the formation of the epoxy ester advantageously avoids unwanted molecular weight advancement while the liquid ethylenic monomers serve as a temporary solvent for the epoxy-ester which in turn facilitates the simple dispersion of the organic mixture into water. Once epoxy resin is reacted with a low molecular weight, acid functional polyester oligomer in accordance with the invention, the resultant epoxy ester can be dissolved in acrylic monomer and dispersed into water with very low levels of ammonia. The epoxy-ester is water dispersed and becomes addition grafted (crosslinked) with the copolymerized ethylenic monomers to form a very small particle microgel stably dispersed in water. Grafting of the epoxy-ester with ethylenic monomers in water produces very small size crosslinked microgel particles, a physical property particularly useful for producing tough but resilient and flexible coatings.

This invention incorporates the advantages of epoxy chemistry providing good barrier properties and excellent resistance to flavor absorption along with a synthesis technique that eliminates the need for organic solvents, organic amines, and surfactants. Baked paint films utilizing the resulting polymeric binder are clear, glossy, solvent resistance, and water resistant. These and other advantages of this invention will become more apparent by referring to the detailed description of the invention and the illustrative examples.

SUMMARY OF THE INVENTION

Briefly, the zero VOC protective coating composition of this invention is substantially free of volatile organic compounds and surfactants and is based on an aqueous dispersed polymeric binder comprising an epoxy-ester acrylic polymeric binder grafted with ethylenic monomers to produce an epoxy-ester-acrylic emulsion polymer. The polymer is produced by copolymerizing the aqueous dispersed mixture of carboxyl functional epoxy-ester and ethylenically unsaturated monomers to produce very small particle microgel particles comprising a stable aqueous dispersed epoxy-ester-acrylic polymeric binder. The polymeric binder comprises by weight between about 1% and 70% epoxy, between 1% and 70% polyester, with the balance being copolymerized ethylenic monomers at a level above 1% based on the weight of the polymeric binder.

DETAILED DESCRIPTION OF THE INVENTION

The protective coating of this invention is based on an aqueous dispersed polymeric binder comprising an epoxy-ester-acrylic copolymer.

The epoxy-ester comprises the esterification reaction product of an epoxide functional resin esterified with a carboxylic acid functional, low molecular weight polyester oligomer. A useful epoxy-ester can be produced, for example, by reacting a monofunctional or difunctional epoxide resin with a carboxylic acid functional polyester oligomer to produce a carboxyl functional epoxy-ester copolymer.

Epoxide functional resins are characterized by the three-membered ether group:

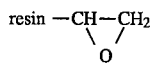

where any one of the hydrogens can be a lower alkyl group, where said three-membered ring is commonly referred to as an epoxy or oxirane group and such groups typically terminate epoxy backbone chains and/or branched chains. Epoxy-ester groups are formed by esterification of an epoxy group with a carboxyl functional polyester oligomer to produce a carboxyl functional epoxy ester. Useful epoxide functional resin comprise conventional bisphenol epoxy resins, glycidyl functional resins, epoxy novalac resins, and alkylene oxide resins. Bisphenol epoxies are preferred and are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-F, bisphenol-S, and 4,4'- dihydroxy bisphenol, with the most preferred being bisphenol-A. Halohydrins include epichlorohydrin, dichlorohydrin, and 1,2-dichloro-3-hydroxypropane with the most preferred being epichlorohydrin. Preferred epoxy resins comprise the coreaction product of excess molar equivalents of epichlorohydrin with bisphenol-A to produce predominantly an epoxy group terminated linear molecular chain of repeating units of diglycidyl ether of bisphenol-A containing between 2 and 25 repeating copolymerized units of diglycidyl ether of bisphenol-A. In practice, an excess molar equivalent of epichlorohydrin is reacted with bisphenol-A to produce epoxy resins where up to two moles of epichlorohydrin coreact with one mole of bisphenol-A, although less than complete reaction can produce difunctional epoxy resin along with monoepoxide chains terminated at the other end with a bisphenol-A unit. The most preferred linear epoxy resins are polyglycidyl ethers of bisphenol-A having terminating 1,2-epoxide groups. Commercially available lower molecular weight resins include Dow Chemical epoxy resins identified by trade number and average molecular weights as follows: DER 333 (380); DER 661 (525); while Shell Chemical epoxy resins are EPON 828 (380); EPON 836 (625); EPON 1001 (525); EPON 1007 F (4000); and Ciba-Geigy linear epoxy resins GT-7013 (1400); GT-7014 (1500); GT 7074 (2000); and GT-259 (1200). Particularly preferred lower molecular weight epoxy materials include EPON 828, EPON 1001, DER 333, and DER 661 having a number average molecular weight less than 1,000 and preferably between 300 and 500, measured by gel permeation chromatography (GPC) according to ASTM methods such as D3536-76, D3593-80, or D3016-78. Preferred epoxy equivalent weight epoxy resins have an equivalent weight between 100 and 1,000, and preferably between 180 and 500. High equivalent weight epoxy resins form a viscous melt when combined with acid functional polyester oligomers causing mixing problems, although epoxy blends containing minor amounts of high molecular weight epoxy resins are workable.

Epoxy resins further include non-aqueous alkylene oxide resins which are epoxide functional resins comprising an alkylene oxide adduct of a bisphenol compound. The alkylene oxide is an aliphatic alkyl derivative having up to about 26 carbon atoms although preferred oxides are lower alkyl oxides such as ethylene, propylene, and butylene oxides. Bisphenol compounds include bisphenol-A, bisphenol-F and bissulfone or sulfides. Typically two or more moles of alkyl oxide are coreacted with one mole of bisphenol compound. Preferred compositions are 2:1 molar reactions while suitable molecular weight range of alkylene oxide resins is between 200 and 1,000 as measured by GPC.

Referring next to the low molecular weight polyester oligomers esterified with the low molecular weight epoxy resins in accordance with this invention, useful polyester oligomers comprise the esterification products of glycols, diols, or polyols with excess equivalents of dicarboxylic acid anhydrides or polycarboxylic acids, where the polyester oligomers are unsaturated polyesters containing ethylenic unsaturation. Linear aliphatic glycols are esterified with greater molar amounts of aromatic dicarboxylic acid and/or linear dicarboxylic acid having between 2 and 36 linear carbon atoms such as adipic, azelaic, succinic, glutaric, pimelic, suberic or sebacic acid, as well as unsaturated dicarboxylic acids such as maleic, fumaric or itaconic acid to produce low molecular weight, unsaturated polyesters. Although not preferred, minor amounts of monocarboxylic unsaturated acid such as acrylic, methacrylic or ethacrylic acid can be esterified. Preferred and commercially available linear saturated dicarboxylic acids are dodecanedioic acid, dimer fatty acids, or azelaic acid, while preferred unsaturated acid are maleic and fumaric. Aromatic dicarboxylic acids (anhydrides) include phthalic, isophthalic, terephthalic, and tetrahydrophthalic. Minor amounts of polyfunctional acids such as trimelletic acids can be added. Suitable glycols include linear aliphatic glycols having 2 to 16 carbon atoms such as 1,3- or 1,4-butylene glycol, 1,6-hexane diol, neopentyl glycol, propylene glycol, ethylene glycol and diethylene glycol, propylene, and dipropylene glycol, and similar linear glycols. Preferred glycols are hydrophobic glycols such as hydrogenated Bisphenol A neopentyl glycol and 1,6-hexane diol. Although not desirable, minor amounts of polyols can be used such as glycerol, pentaerythritol, dipentaerythritol, or trimethylol ethane or propane. The molar deficiency of the glycol over the greater molar amounts of aromatic and linear saturated dicarboxylic acid is between about 1% and 50% and preferably between about 20% and 50%, where at least 1 molar % and preferably between 20% and 100% molar percent of the carboxylic acid components comprises ethylenically unsaturated mono or dicarboxylic acid. The polyester contains considerable excess unreacted carboxylic groups to provide a carboxylic acid functional polyester having an Acid No. between 30 and 500 and preferably between 100 and 300 milligrams of KOH per gram epoxy ester. The molecular weight of useful polyester oligomer polymers are between 200 and 3,000 and preferably between 300 and 1,500.

Acid functional polyester oligomers can be prepared by esterification of the common diacids with dihydroxyl compounds. Useful glycols include for instance ethylene glycol, propylene glycol, butanediols, diethylene glycol, dipropylene glycol, triethylene glycol, hexane diol, and similar glycols. Preferred glycols such as propylene, butylene, diethylene glycol and the like can be reacted with diacids such as maleic, adipic, isophthalic acid and the like at an excess of acid to hydroxyl functionality, to produce a carboxylic acid functional polyester having a preferred molecular weight about 300 to 1,500. Sufficient acid functionality in the polyester oligomer needs to be present to allow reaction with the epoxy resin, and then dispersion into water. The acid number of the epoxy-ester resin (the reaction product of the acid functional polyester oligomer and the epoxy resin) should be about 30 to 200 mg KOH per gram of epoxy ester and preferably between 50 and 150. The epoxy-ester has a number average molecular weight between 500 and 4,000 and preferably between 600 and 2,000. Small quantities of monofunctional acids and alcohols (such as benzoic acid, 2-ethylhexanoic acid, benzyl alcohol and the like) can be used to modify the polyester structure, as can polyfunctional acids and alcohols (such as trimellitic anhydride, trimethylol propane, and the like). Polyfunctional alcohols and acids can serve to provide higher acid contents to the polyesters, which can render the resultant epoxy esters more water dispersible. Polyester oligomers containing unsaturated diacids (fumaric and maleic) are preferred, as the unsaturation provides grafting and crosslinking functionality for the acrylic monomer. The polyester component can be synthesized by bulk polymerization, where the raw materials are charged in bulk and esterified at temperatures typically between 170° C. to 240° C., although moderately higher or lower temperatures can be utilized satisfactorily. An esterification catalyst can be used, typically an organic tin compound at less than 1% levels based on weight of the charge.

Epoxy-esters are formed by the reaction of the preformed epoxy resins with the preformed acid functional polyester oligomers. Although considerable levels of free diacid may be present in the carboxyl polyester oligomers, any unreacted carboxylic material ordinarily react with epoxy groups without substantially affecting the properties of the epoxy-ester. Nucleophilic compounds such as tertiary amines are excellent catalysts for this epoxy acid reaction, which can be carried out at about 30° to 120° C., but preferably from about 70° C. to 110° C. Temperatures higher than about 120° C. should be avoided, as resin viscosity can rise quickly, and gelation can result. Hence, epoxy polyester mixtures which are fluid, and can be easily mixed at about 100° C. are preferred. Preferred epoxy-esters contain from about 10% to 90% by weight epoxy resin with the remaining weight being oligomer polyester and dicarboxylic acid if any. Epoxies will react with carboxyl polyester oligomers at 100° to 140° C. without a catalyst, but the reaction proceeds quicker and at preferred lower temperatures in the presence of a suitable nucleophile, such as tertiary amine. Good reaction rates in the presence of about 0.1% benzyldimethyl amine occur at about 70° C. to 100° C.

Once formed, the epoxy esters can be dissolved in acrylic monomer to reduce the resin viscosity to render the epoxy-ester more easily dispersible in water. However, lower viscosity, low molecular weight epoxy-esters can be dispersed directly into water without the addition of monomer, in which case the ethylenic monomers can be added after the aqueous dispersion of epoxy-ester is formed. The carboxyl functional epoxy-ester is dispersed by neutralizing at least partially with ammonia and forming a small particle size dispersion in water, whereupon the epoxy-ester is copolymerized in water with ethylenic monomers to produce internally crosslinked microdispersions of crosslinked epoxy-ester.

Copolymerizable ethylenically unsaturated monomers useful for reacting with the unsaturated epoxy ester polymer are monomers containing carbon-to-carbon, ethylenic unsaturation and include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexene as well as conjugated dienes such as 1,3 butadiene, methyl-2-butadiene, 1,3-piperylene, 2,3-dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomer include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxy propyl acrylates and methacrylates, as well as amino acrylates and methacrylates. Carboxylic acid functional monomers can be included if desired. Carboxylic acid monomer include acrylic and methacrylic acids. Acrylic acids include acrylic and methacrylic acid, ethacrylic acid, alpha-chloracrylic acids, alpha-cyanoacrylic acid, crotonic acid, and beta-acryloxy propionic acid. Ethylenic monomer mixtures of acrylic and/or methacrylic esters with styrene are preferred. Styrene copolymerized very efficiently with the double bond unsaturation in the epoxy-ester. On a weight basis of total ethylenic monomers, the ethylenic monomers preferably comprise between 0% and 100% styrene monomers, and preferably between 20% and 80% styrene monomer, with the balance being other ethylenic monomers.

On a weight basis, the epoxy polyester-acrylic crosslinked copolymer contains between 1% and 90%, and preferably between 25% and 70% addition polymer component of copolymerized monomers based on the total weight of the epoxy-ester-acrylic copolymer with the balance being the epoxy-ester polymer component. The acrylic crosslinked epoxy-ester copolymer comprises between 1% and 70% epoxy, between 1% and 70% polyester, with the balance being copolymerized ethylenic monomer while preferred compositions contain between 1% and 50% epoxy, between 1% and 50% polyester, with the balance being copolymerized ethylenic monomers. Most preferred compositions contain 10% to 40% epoxy and 10% to 40% polyester with 25% to 70% copolymerized monomer.

The Acid No. of the epoxy-polyester-acrylic graft polymer is preferably between about 25 and 150. The number average molecular weight of the epoxy polyester-acrylic crosslinked polymer is above about 50,000 and typically the crosslinked microgel particles of epoxy-ester-acrylic molecular weight readily exceeds and is typically well over 1,000,000.

In accordance with this invention, the epoxy ester solution in monomer can be easily dispersed into water by simple mixing with water containing ammonia sufficient to neutralize a substantial portion of the acid groups available in the epoxy ester. About 0.5 to 5% by weight ammonia as $NH_3$ on polymeric solids is typical. Aqueous dispersion pH's close to 7 are preferred to eliminate the possibility of polyester hydrolysis. Acrylic monomers can be polymerized and initiated with any of the common free radical initiators, such as the peroxides, persulfates, peresters, and the azo initiators. Peroxide and perester redox initiation is preferred with systems such as Na formaldehyde sulfoxylate/Fe/persulfate, and ascorbic acid/Fe/t-butyl perbenzoate.

The resulting acrylic crosslinked epoxy-ester copolymers comprise very small micro-dispersion, crosslinked microgel polymer particles having an average microgel particle size below 0.2 microns and preferably on average between 0.02 and 0.06 microns. The microgel particles produced by ethylenic monomer crosslinking of the water dispersed, linear epoxy-ester polymer surprisingly provides highly crosslinked copolymers in the form of a stable aqueous microdispersion of extraordinary small internally crosslinked microgel polymer particles without the need for and particularly without external surfactants. Excellent protective film formations on substrates are achieved without surfactants and even though the microgel particles are internally highly crosslinked. Hence, the quality coatings for interior beverage cans can be produced with acrylic crosslinked epoxy-ester microgel polymeric particles. Aqueous dispersions of these blended resins can be prepared in water with ammonia neutralization without the use of any volatile solvent. The acid functional epoxy esters (dissolved in acrylic monomer) can be easily dispersed into water with low to moderate shear. Polymerization of the acrylic monomers produces the polymer blend in the form of very small particle size microgel crosslinked polymer particles in dispersion form. Cured films exhibit excellent water resistance, and good clarity and gloss.

The merits of this invention are further illustrated upon referring to the following illustrative examples.

EXAMPLE 1

An acid functional polyester oligomer and epoxy ester was prepared as follows:

| Grams | |
|---|---|
| 180.2 | 1,3-butylene glycol |
| 392 | maleic anhydride |
| 0.5 | piperidine (maleic to fumaric isomerization catalyst) |

The above raw materials were warmed with good stirring to about 120° C., held for 2 hours, and then cooled. Titration gave an Acid No. of 133 equivalent weight (143 theoretical). Then 266 g of the above unsaturated polyester was combined with 188 grams DER 333 epoxy (epoxy equivalent weight 190 Dow Chemical). The mixture was warmed while controlling exotherm and limiting the reaction mixture temperature to 100° C. to produce an epoxy-ester having an Acid No. of 120 and a number average molecular weight of about 1,000.

EXAMPLE 2

An epoxy ester acrylic copolymer resin dispersion was prepared as follows:

| | Grams | |
|---|---|---|
| a) | 554 | epoxy ester from Example (1) |
| | 340 | styrene |
| | 114 | butyl acrylate |
| b) | 900 | water |
| | 121 | ammonia (28%) |
| c) | 1605 | water |
| d) | 9.0 | t-butyl perbenzoate |
| e) | 9.0 | ascorbic acid |
| f) | 5 ml | $FeSO_4$ solution, 1000 ppm |

Epoxy ester of Example 1 was mixed in monomers to form liquid mix (a), and then dispersed into (b) which had been purged with nitrogen at 20° C. for two hours. The mixture was mixed with a paddle stirrer at about 300–500 rpm for about 2 minutes, and then (c) was added, which has also was purged with nitrogen at 20° C. for 2-hours. Components (d), (e), and (f) were added sequentially to the dispersion, and the reaction mixture was insulated such that the temperature rose to about 50° C. The mixture was held for 2 hours, and then 1 g additional t-butyl perbenzoate was added.

EXAMPLE 3

A polyester oligomer and an epoxy ester was prepared as in Example (1), but using 27.5 g maleic anhydride, 155.8 g diethylene glycol, 1.0 g piperidine, and 278.7 g DER 333. Then 0.5 g triethylene diamine was added to the epoxy ester after 2 hours at 95° C., held for 2 more hours prior to cooling. Then 181 grams styrene were added during the cool down to cut viscosity.

EXAMPLE 4

An epoxy ester acrylic blended resin dispersion was prepared as follows:

| | Grams | |
|---|---|---|
| a) | 125 | epoxy ester in styrene from example (3) |
| | 75 | styrene (additional) |
| | 1 | t-butyl perbenzoate |
| b) | 200 | water |
| | 12 | ammonia, 28% |
| c) | 400 | water |
| d) | 2.0 | ascorbic acid (10% in water at pH 6.5) |
| e) | 2 | $FeSO_4$ solution, 1000 rpm |

Solution (a) was poured into (b) with 500 rpm paddle agitation, and then (c) was added. Ammonia was added dropwise to give pH 6.5. Then (d) and (e) were added in sequence. Both (b) and (c) were previously purged 2 hours with nitrogen. Exotherm was immediate, rising to 50° C. in about 15 minutes. Then 1 g additional t-butyl perbenzoate was added after 2 hours.

EXAMPLE 5

Example (4) was repeated but included 75 g of the epoxy ester solution in styrene, and the addition of an additional 125 g styrene.

RESULTS

Resin dispersions of Examples 2, 4, and 5 were all free from grit, shear stable, and very small in particle size (<0.1 micron).

Draw down samples of resins in Examples 2, 4, and 5 on aluminum sheet with a #28 wire wound bar were baked at 390° F. for 2 minutes to provide the following cured film properties:

| Sample | Gloss | Clarity | Water Resistance |
|--------|-------|---------|------------------|
| 2 | high | good | no blush noted |
| 4 | high | good | no blush noted |
| 5 | high | good | no blush noted |

Resin Example 2 was exposed to 180° F. water for 30 minutes, while samples 4, 5 were exposed to boiling water for 5 minutes.

The foregoing description and representative examples illustrate the merits of this invention but are not intended to be limiting except as defined by the appended claims.

I claim:

1. In a process for producing an aqueous dispersed, protective coating composition substantially free of volatile organic compounds and containing a polymeric binder dispersed into water, the polymeric binder being emulsion polymerized microgel polymer particles the process comprising:

esterifying by weight between 1% and 70% low molecular weight epoxy resin having a number average molecular weight between about 100 and 1,000 with between 1% and 70% low molecular weight, carboxyl functional, unsaturated polyester oligomer having an Acid No. between about 30 and 500 and a number average molecular weight between about 200 and 3,000 to form a carboxyl functional unsaturated epoxy-ester having an Acid No. between about 30 and 200;

dispersing the carboxyl functional epoxy-ester into water by at least partially neutralizing the carboxyl functional epoxy-ester with ammonia;

copolymerizing by emulsion polymerization at least 1% by weight ethylenic monomer in the presence of the carboxyl functional unsaturated epoxy-ester dispersed into water to produce internally crosslinked emulsion microgel polymer particles of a copolymer of emulsion polymerized ethylenic monomer crosslinked with the epoxy-ester by addition copolymerization crosslinking, the emulsion microgel polymer particles having an Acid No. between about 25 and 150, where the emulsion crosslinked microgel polymer particles have an average particle size less than 0.20 microns, and said microgel polymer particles are stably dispersed into water without surfactant.

2. The process of claim 1 where the ethylenic monomer contains acrylic monomer, and the emulsion polymerized microgel polymer particles are an acrylic crosslinked epoxy-ester copolymer.

3. The process of claim 1 where the ethylenic monomers are added with the unsaturated epoxy-ester prior to dispersing the unsaturated epoxy-ester into water.

4. The process of claim 1 where the unsaturated epoxy ester is first dispersed into water followed by dispersing the ethylenic monomers.

5. An aqueous dispersed, protective coating composition substantially free of volatile organic compounds and containing a polymeric binder dispersed into water, the polymeric binder comprising emulsion polymerized, internally crosslinked, microgel copolymer particles of ethylenic monomer crosslinked by addition copolymerization crosslinking with aqueous dispersed, carboxyl functional, unsaturated epoxy-ester produced by the process of claim 1, the crosslinked microgel copolymer containing by weight (a) between 1% and 70% of the low molecular weight epoxy resin, (b) between 1% and 70% of the polyester oligomer, and (c) between 1% and 90% of copolymerized ethylenic monomer.

6. The coating composition of claim 5 where the coating composition is free of volatile organic compounds and the emulsion polymerized, crosslinked, microgel polymer particles contain by weight between 1% and 50% of the epoxy resin and between 1% and 50% of the polyester oligomer.

* * * * *